United States Patent
Liu et al.

(10) Patent No.: US 11,622,327 B2
(45) Date of Patent: Apr. 4, 2023

(54) ADAPTIVE RECEPTION OF CELL BROADCAST SERVICE

(71) Applicant: Microsoft Technology Licensing, LLC, Redmond, WA (US)

(72) Inventors: Liyuan Liu, Beijing (CN); Jian Li, Beijing (CN)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/329,693

(22) PCT Filed: Aug. 30, 2016

(86) PCT No.: PCT/CN2016/097364
§ 371 (c)(1),
(2) Date: Feb. 28, 2019

(87) PCT Pub. No.: WO2018/039924
PCT Pub. Date: Mar. 8, 2018

(65) Prior Publication Data
US 2019/0200293 A1    Jun. 27, 2019

(51) Int. Cl.
*H04W 52/02*    (2009.01)
*H04W 76/28*    (2018.01)
*H04W 4/06*    (2009.01)

(52) U.S. Cl.
CPC ......... *H04W 52/0216* (2013.01); *H04W 4/06* (2013.01); *H04W 76/28* (2018.02); *Y02D 30/70* (2020.08)

(58) Field of Classification Search
CPC ......... H04L 47/10; H04L 47/30; H04L 47/11; H04L 47/12; H04L 2012/5631;
(Continued)

(56) References Cited

U.S. PATENT DOCUMENTS

| 7,747,235 B2 | 6/2010 | Lee et al. |
| 8,229,390 B2 | 7/2012 | Lee et al. |

(Continued)

FOREIGN PATENT DOCUMENTS

| CN | 103975610 A | 8/2014 |
| CN | 104054361 A | 9/2014 |

(Continued)

OTHER PUBLICATIONS

Mihov, et al., "Analysis and Performance Evaluation of the DRX Mechanism for Power Saving in LTE", In Proceedings of the IEEE 26th Convention of Electrical and Electronics Engineers in Israel, Nov. 17, 2019, 5 Pages.

(Continued)

*Primary Examiner* — Brenda H Pham
(74) *Attorney, Agent, or Firm* — Ray Quinney & Nebeker P.C; James Bullough (57) ABSTRACT

According to implementations of the subject matter described herein, a new approach for receiving the CBS message is proposed. Generally speaking, upon receipt of CBS messages from a network device in a first receiving time interval of a first DRX period, a terminal device will detect whether there is a change among the CBS messages. On the basis of the detection, the terminal device will determine a configuration of a second DRX period that at least includes a second dormant time interval after the first receiving time interval and a second receiving time interval for receiving further CBS messages. That is, the further CBS messages are received in a second DRX period determined through a self-learning process performed on the received CBS messages and the first DRX period. In this way, the power consumption of the terminal device for receiving the CBS messages can be reduced. As a result, the battery life of the terminal device can be guaranteed.

17 Claims, 3 Drawing Sheets

(58) Field of Classification Search
CPC ..... H04L 47/15; H04L 47/2441; H04L 47/70; H04L 47/35; H04L 47/32; H04L 12/5602; H04L 2012/5636; H04L 2012/5632; H04B 7/2123; H04B 7/212; H04W 72/04; H04W 88/08; H04W 76/00; H04W 84/08; H04W 76/02
USPC ........ 370/229, 230, 231, 235, 322, 329, 341
See application file for complete search history.

(56) References Cited

U.S. PATENT DOCUMENTS

| | | |
|---|---|---|
| 8,285,346 B2 | 10/2012 | Fodor et al. |
| 8,611,289 B2 | 12/2013 | Lecki et al. |
| 8,688,119 B2 | 4/2014 | Sagfors et al. |
| 8,964,616 B2 | 2/2015 | Schwartz et al. |
| 2011/0003600 A2 | 1/2011 | Beckmann et al. |
| 2011/0201365 A1 | 8/2011 | Segura |
| 2011/0269462 A1* | 11/2011 | Sagfors ............ H04W 36/36 455/436 |
| 2012/0120843 A1* | 5/2012 | Anderson ........ H04W 52/0232 370/253 |
| 2012/0281566 A1* | 11/2012 | Pelletier ............ H04W 76/27 370/252 |
| 2013/0176951 A1 | 7/2013 | Dhanda et al. |
| 2013/0208639 A1 | 8/2013 | Janga et al. |
| 2013/0265928 A1* | 10/2013 | Martinez Tarradell ........... H04L 1/189 370/312 |
| 2013/0294307 A1* | 11/2013 | Johansson ........ H04W 52/0216 370/311 |
| 2013/0295943 A1* | 11/2013 | Pasumarthi ...... H04W 72/0446 455/450 |
| 2014/0010132 A1* | 1/2014 | Ma .................. H04W 52/0209 370/311 |
| 2014/0078945 A1 | 3/2014 | Schwartz et al. |
| 2014/0086123 A1 | 3/2014 | Deivasigamani et al. |
| 2014/0247760 A1 | 9/2014 | Telang et al. |
| 2014/0348072 A1* | 11/2014 | May-Weymann ...... H04W 4/06 370/329 |
| 2014/0357183 A1 | 12/2014 | Rathonyi et al. |
| 2014/0376429 A1 | 12/2014 | Khay-ibbat |
| 2015/0351151 A1* | 12/2015 | Huang ............ H04W 36/0085 370/252 |
| 2017/0086046 A1* | 3/2017 | Ponukumati ........ H04L 12/1895 |
| 2018/0084524 A1* | 3/2018 | Pradas .................. H04W 68/02 |

FOREIGN PATENT DOCUMENTS

| | | |
|---|---|---|
| CN | 104285484 A | 1/2015 |
| EP | 2457403 A1 | 5/2012 |
| KR | 20090014981 A | 2/2009 |

OTHER PUBLICATIONS

"Digital cellular telecommunications system (Phase 2+); Short Message Service Cell Broadcast (SMSCB) support on the mobile radio interface (3GPP TS 44.012 version 10.0.0 Release 10)", Retrieved From: https://www.etsi.org/deliver/etsi_ts/144000_144099/144012/10.00.00_60/ts_144012v100000p.pdf, Apr. 1, 2011, 16 Pages.

"Extended European Search Report Issued in European Patent Application No. 169144912", dated Nov. 25, 2019, 8 Pages.

PCT/CN2016/097364, "International Search Report and Written Opinion Issued in PCT Application No. PCT/CN2016/097364", dated May 4, 2017, 13 pages.

"Office Action Issued in European Patent Application No. 16914491.2", dated Dec. 2, 2020, 5 Pages.

"First Office Action and Search Report Issued in Chinese Patent Application No. 201680088457.X", dated Dec. 23, 2020, 12 Pages.

"Second Office Action Issued in Chinese Patent Application No. 201680088457.X", dated Aug. 2, 2021, 8 Pages.

"Notice of Allowance Issued in European Patent Application No. 16914491.2", dated Mar. 11, 2022, 2 Pages.

* cited by examiner

ADAPTIVE RECEPTION OF CELL BROADCAST SERVICE

RELATED APPLICATION

This application is a U.S. Nationalization of International Patent Application No. PCT/CN2016/097364 filed on Aug. 30, 2016. The aforementioned application is incorporated by reference in its entirety.

BACKGROUND

Cell Broadcast Service (CBS) is designed for simultaneous delivery to multiple users in a specified area, and is a technology that allows cell operators to broadcast messages to terminal devices in cell(s). CBS messages may contain information related to traffic, weather, general advertisements, emergency related messages, or the like. The geographical scope of a CBS message may be one cell within a public land mobile network (PLMN), a group of cells in a PLMN, or the entire PLMN. A terminal device in the PLMN may receive the CBS message broadcasted from a network device. For a terminal device, the CBS message can be received when a CBS function on the device is enabled. In other words, unless the CBS function is enabled, the terminal device could not receive any CBS message. However, if the CBS function is enabled for a long time period, power consumption of the terminal device would be very high.

SUMMARY

Generally speaking, a new approach for receiving CBS messages is proposed herein. In accordance with implementations of the subject matter described herein, a Discontinuous Reception (DRX) period includes at least a receiving time interval for receiving CBS messages and a dormant time interval without receipt of CBS messages. Upon receipt of CBS messages from a network device in a first receiving time interval of a first DRX period, a terminal device will detect whether there is a change among the CBS messages. On the basis of the detection, the terminal device will determine a configuration of a second DRX period that at least includes a second dormant time interval after the first receiving time interval and a second receiving time interval for receiving further CBS messages. That is, the further CBS messages are received in a second DRX period determined through a self-learning process performed on the received CBS messages and the first DRX period. In this way, the power consumption of the terminal device for receiving the CBS messages can be reduced, for example, in the case that there is no change in the received CBS messages. As a result, the battery life of the terminal device can be guaranteed, even when transmission of CBS messages is frequent.

It is to be understood that the Summary is not intended to identify key or essential features of implementations of the subject matter described herein, nor is it intended to be used to limit the scope of the subject matter described herein. Other features of the subject matter described herein will become easily comprehensible through the description below.

BRIEF DESCRIPTION OF THE DRAWINGS

The details of one or more implementations of the subject matter described herein are set forth in the accompanying drawings and the description below. Other features, aspects, and advantages of the disclosure will become apparent from the description, the drawings, and the claims, wherein:

Throughout the figures, same or similar reference numbers will always indicate same or similar elements.

DETAILED DESCRIPTION

Principle of the subject matter described herein will now be described with reference to some example implementations. It is to be understood that these implementations are described only for the purpose of illustration and help those skilled in the art to understand and implement the subject matter described herein, without suggesting any limitations as to the scope of the disclosure. The disclosure described herein can be implemented in various manners other than the ones describe below.

As used herein, the term "include" and its variants are to be read as open terms that mean "include, but is not limited to". The term "based on" is to be read as "based at least in part on". The term "a" is to be read as "one or more" unless otherwise specified. The term "one implementation" and "an implementation" are to be read as "at least one implementation". The term "another implementation" is to be read as "at least one other implementation". Moreover, it is to be understood that in the context of the subject matter described herein, the terms "first", "second" and the like are used to indicate individual elements or components, without suggesting any limitation as to the order of these elements. Further, a first element may or may not be the same as a second element. Other definitions, explicit and implicit, may be included below.

In addition, it is to be understood that in the context of the present disclosure, the terms "less than," "exceeding," and "above" mean "less than or equal to," "exceeding or equal to," and "above or equal to," respectively.

Conventionally, different operators have various configurations for supporting CBS in their service networks, for example, 2G, 3G and 4G networks. For a terminal device in these networks, enabling the CBS function to receive CBS messages would increase quite a lot of power consumption. This may negatively impact the stand-by time of the terminal device. Some terminal devices may have user interface (UI) switch to enable/disable the CBS function. However, such operation would increase the complexity of the UI and hence brings more steps for user to interact with the terminal devices. Thus, the traditional schemes for reception of CBS messages would not be a suitable solution for receiving CBS messages while guaranteeing the stand-by time of a terminal device.

In order to at least partially solve the above and other potential problems, a new method and device for receiving CBS messages are provided herein. According to implementations of the subject matter described herein, a terminal device receives CBS messages in a discontinuous way for reducing power consumption. In particular, the terminal device receives CBS messages in a receiving time interval and does not receive any CBS message in a dormant time interval. After the dormant time interval, the terminal device keeps receiving further CBS messages in a subsequent receiving time interval. In the implementations of the subject matter described herein, upon receiving a CBS message in a DRX period (referred to as a "first DRX period"), a terminal device detects whether there is a change among the CBS messages. Then a configuration of a subsequent DRX period (referred to as a "second DRX period") for receiving further CBS messages may be determined based on the detection. As such, the second DRX period can be determined in a self-learning way.

Through the self-learning process, the terminal device may receive further CBS messages in a flexible receiving time interval, instead of always receiving CBS messages on the basis of a fixed time interval. In this way, if content of the broadcasted CBS messages remains unchanged, the time window for the terminal device 110 to receive further CBS messages may be reduced. As a result, the power consumption of the terminal device for receiving the CBS messages is reduced. The battery life of the terminal device thus can be guaranteed. Some example implementations will now be described.

Figure 1:
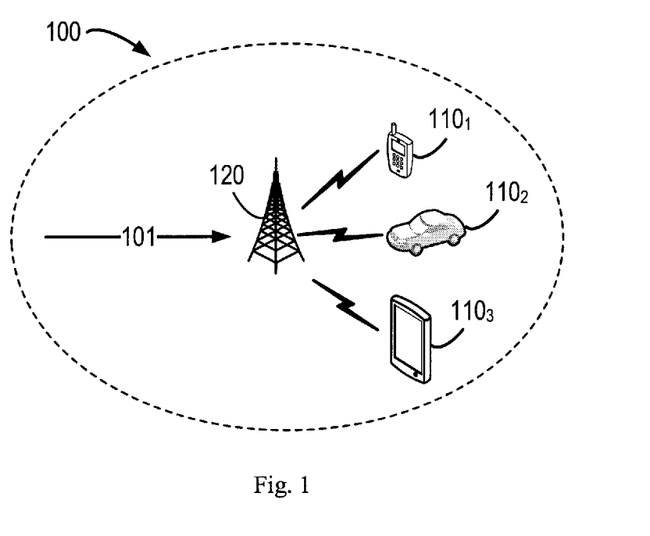
FIG. 1 is a schematic diagram illustrating an environment 100 in which example implementations of the subject matter described herein can be implemented.

FIG. 1 shows a block diagram illustrating an environment 100 in which example implementations of the subject matter described herein can be implemented. For the sake of discussions, some example implementations of the subject matter described herein will be described with reference to the environment 100. However, it is to be understood that such an environment is described merely for the purpose of illustration, without suggesting any limitations as to the scope of the subject matter described herein.

As shown, the environment 100 includes terminal devices $110_1$, $110_2$, and $110_3$ (collectively referred to as "terminal device 110") and a network device 120. It is to be understood that although three terminal devices 110 are shown, the environment 100 may include any suitable number of devices. Likewise, the environment 100 may include two or more network devices 120.

A network device 120 may be any suitable device in a communication network, from which a terminal device may receive services. The network device may be a base station (BS), an access point (AP), a server or any other suitable device in the communication network. The BS may be, for example, a node B (NodeB or NB), an evolved NodeB (eNodeB or eNB), a Remote Radio Unit (RRU), a radio header (RH), a remote radio head (RRH), a relay, a low power node such as a femto, a pico, and so forth.

A terminal device 110 refers to any device that can communicate with the network device and receive services from communication a network. By way of example and not limitation, the terminal device refers to a mobile terminal, user equipment (UE), or other suitable device. The UE may be, for example, a Subscriber Station (SS), a Portable Subscriber Station, a Mobile Station (MS), or an Access Terminal (AT). The terminal device may include, but not limited to, a mobile phone, a cellular phone, a smart phone, a laptop computer, a tablet, a personal digital assistant (PDA), a vehicle, and the like.

As shown in FIG. 1, a CBS message(s) 101 may be generated by a Cell Broadcast Center (CBC), for example. The CBS message may contain information related to one or more of traffic, weather, general advertisements, emergency related messages, and the like. The CBC sends the CBS message 101 to the network device 120. The network device 120 broadcasts the CBS message 101 to terminal devices 110 on the basis of a certain time interval. In accordance with implementations of the subject matter described herein, upon receipt of CBS messages from the network device 120 in a first receiving time interval of a first DRX period, the terminal device 110 detects whether there is a change among these received CBS messages. Then, the terminal device 120 determines a configuration of a second DRX period based on the detection.

Figure 2:
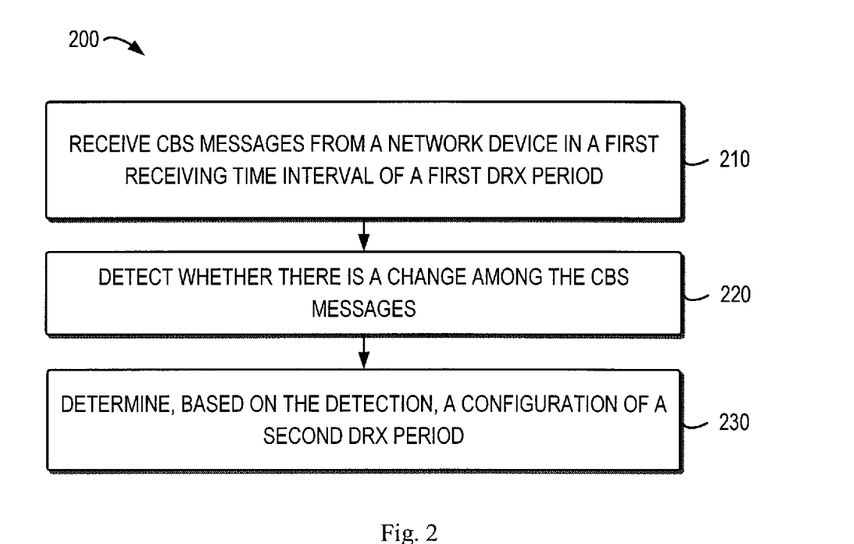
FIG. 2 is a flowchart illustrating a method 200 for receiving CBS messages in accordance with an example implementation of the subject matter described herein.

The functionalities and operations of the terminal device 110 will now described with reference to FIG. 2, which is a flowchart illustrating a method 200 for receiving CBS messages in accordance with an example implementation of the subject matter described herein. In other word, the method 200 is implemented at the terminal device 110.

As shown, at 210, the terminal device 110 receives CBS messages from the network device 120 in a first receiving time interval of a first DRX period. According to implementations of the subject matter described herein, the first DRX period at least includes the first receiving time interval and a first dormant time interval without receipt of CBS messages. It is to be understood that the first DRX period may include one or more time other intervals than the receiving time interval and the dormant time interval. These further time intervals may be used for other purpose and will not detailed herein.

The CBS messages may be transmitted from the network device 120 to the terminal device 110 in the first receiving time interval in a variety of ways. For example, in some implementations, the CBS messages may be received from the network device 120 via a Broadcast and Multicast Control (BMC) protocol layer over a Common Traffic Channel (CTCH) logical channel. It is to be understood that the above example is only discussed for illustration rather than limitation. There may be several other implementations for the terminal device 110 to receive the CBS messages.

At 220, it is detected whether there is a change among the received CBS messages. For example, the terminal device 110 may detect a change in characteristics of the CBS messages, for example, types of the CBS messages, contents in the CBS messages, events carried by the CBS messages, and so on.

In some implementations, at 220, the terminal device 110 may detect a change of types of the CBS messages received in the first receiving time interval (also referred to as the "received CBS message"). The type of a CBS message may indicate that the CBS message is mandatory, optional or advised, which will be discussed in more detail below with reference to FIG. 3. If the terminal device 110 finds that the received CBS messages have different types, then a change among the received CBS messages is detected. Otherwise, the terminal device 110 may determine that there is no change among the received CBS messages.

Alternatively, or in addition, in some implementations, the terminal device 110 may identify broadcast events carried by the CBS messages at 220. As used herein, a broadcast event may relate to, for example, traffic, weather, general advertisements, emergency, or the like. The broadcast events may be identified in a variety of ways. In some implementations, the terminal device 110 may extract contents from the received CBS messages and identify the broadcast events based on the extracted contents. For example, different broadcast events may be identified by different keywords. If it is detected that at least two CBS messages received in the first DRX period carry different events, the terminal device 110 may determine that there is a change among the received CBS messages.

At 230, a configuration of a second DRX period is determined based on the detection at 220. Similar to the first DRX period, the second DRX period at least includes a second dormant time interval after the first receiving time interval, a second receiving time interval for receiving further CBS messages, and possibly one or more other time intervals. The configuration of the second DRX period may be determined in a variety of ways.

For instance, in some implementations, if the terminal device 110 detects the change among the CBS messages, a time length for the second dormant time interval may be set below a dormant threshold. That is, in this event, the second dormant time interval is shortened so that the further CBS messages can be received more frequently. On the other hand, if the terminal device 110 determines that the CBS messages remain unchanged, it may set the time length for the second dormant time interval above the dormant threshold. In other words, the second dormant time interval is lengthened in this case to reduce the frequency of CBS message reception. In sum, the second dormant time interval can be adaptively shortened to receive more different CBS messages expanded to avoid receive too many same or similar CBS messages.

Alternatively, or in addition, in some implementations, if the terminal device 110 detects the change among the CBS messages, a time length for the second receiving time interval may be set above a receiving threshold. On the other hand, if the terminal device 110 determines that the CBS messages remain unchanged, it may set the time length for the second receiving time interval below the receiving threshold. Similar to the adaptive setting of the second dormant time interval, by configuring the second receiving time interval adaptively, it is possible to prevent the terminal device 110 from receiving too many same CBS messages while avoiding missing different CBS messages.

Figure 3:
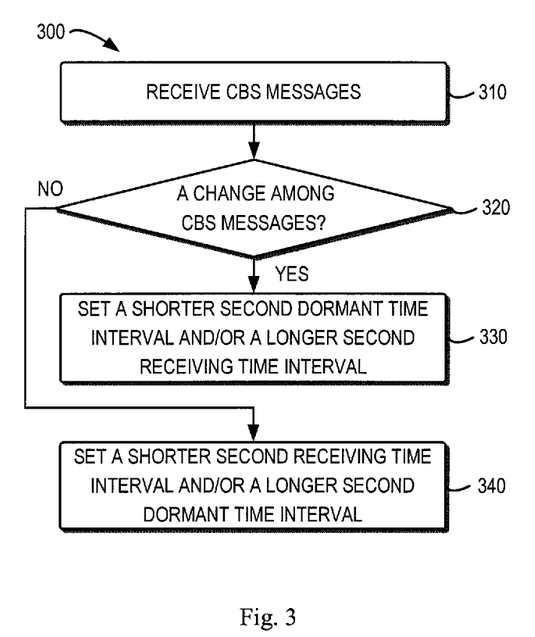
FIG. 3 is a flowchart illustrating another method 300 for receiving CBS messages in accordance with an example implementation of the subject matter described herein.

Now some example implementations of the method 200 will be described with reference to FIGS. 3 and 4. It is to be understood that these implementations can be embodied at the terminal device 110 separately or in combination. FIG. 3 is a flowchart illustrating another method 300 for receiving CBS messages in accordance with an example implementation of the subject matter described herein. It is to be understood that the method 300, which may be performed by the terminal device 110 as shown in FIG. 1, can be considered as an example implementation of the method 200.

At 310, the terminal device 110 receives CBS messages from the network device 120 in a first receiving time interval. Then, at 320, the terminal device 120 detects whether there is a change among the CBS messages. For instance, the terminal device 120 may determine the types of the CBS messages, for example, mandatory, optional, or advised, as described above. A mandatory CBS message refers to a CBS message required to be received without any limitation, such as emergency notifications, disaster warnings, fire alarms, and so on. An optional CBS message refers to a CBS message which is optional for a terminal device to receive, such as advertisement. An advised CBS message refers to a CBS message recommended to be received, such as conference notifications, deal information of an operator, and the like.

It is to be understood that although the types are described as mandatory, optional and advised in the above implementations, this is merely for the purpose of illustration without suggesting any limitation as to the scope of the subject matter described herein. In alternative implementations, other types of CBS messages are also applicable.

In some implementations, a CBS message may include information of its type in a portion of the CBS message, for example, in a header of the CBS message. In some alternative implementations, the information of the type may be included in a separate message transmitted after, before or in parallel with the CBS message. Thus, the terminal device 110 may obtain the information of the type of a CBS message therefrom.

If two or more CBS message received in the first DRX period have different types, a change among the CBS messages is detected at 320. At this point, at 330, the terminal device 110 configures a shorter second dormant time interval. For example, the second dormant time interval may be set below the first formant time interval. Alternatively, or in addition, at 330, the terminal device 110 may implement a longer second receiving time interval for the second DRX period. For example, the second receiving time interval may be set above the first receiving time interval. As such, the frequency of reception of further CBS messages is increased.

On the other hand, if no change is detected in the CBS messages received in the first DRX period at 320, the terminal device 110 may configure a shorter second receiving time interval at 340, for example, shorter than the first receiving time interval. It is also possible for the terminal device 110 to set a relatively longer second dormant time interval for the second DRX period, for example, longer than the first dormant time interval. In this way, the further CBS messages, which are assumed to be the same, can be received less frequently.

Figure 4:
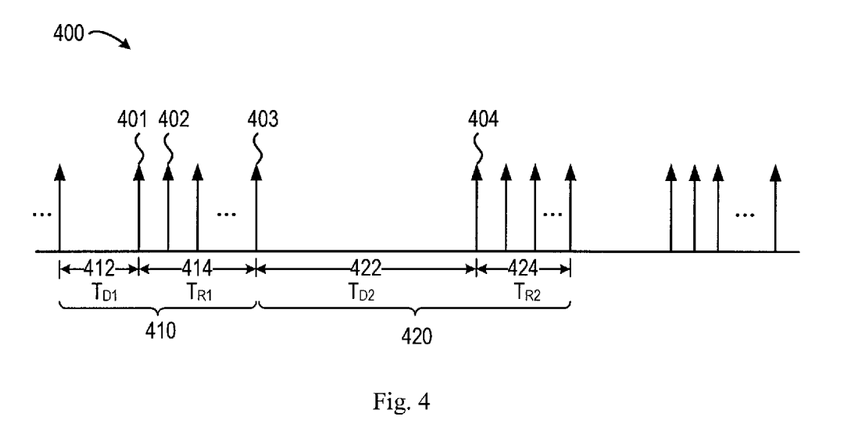
FIG. 4 is a diagram 400 illustrating reception of CBS messages in accordance with an example implementation of the subject matter described herein.

FIG. 4 shows a diagram 400 illustrating reception of CBS messages in accordance with an example implementation of the subject matter described herein. In this example, the first DRX period 410 includes a first dormant time interval $T_{D1}$ 412 and a first receiving time interval $T_{R1}$ 414, while the second DRX period 420 includes a second dormant time interval $T_{D2}$ 422 and a second receiving time interval $T_{R2}$ 424. In the first receiving time interval $T_{R1}$ 414, the terminal device 110 receives a plurality of CBS messages at the respective time points 401, 402, and so on.

Assuming that a change is detected from the CBS messages received in the first receiving time interval $T_{R1}$ 414, the terminal device 110 may set a time length for the second dormant time interval $T_{D2}$ 422 below a dormant threshold (denoted as "$T_{Dth}$"). Such a dormant threshold $T_{Dth}$ may be determined dynamically, for example, depending on various factors such system requirements, experimental values, analysis on historical CBS messages, and so on. Specifically, in an implementation, $T_{Dth}$ may be set equal to or less than the length the first dormant time interval $T_{D1}$ 412. In other words, the second dormant time interval may be set as less than the first dormant time interval, that is, $T_{D2}<T_{D1}$. Only for the purpose of illustration, if $T_{D1}$ is 5 ms, the terminal device 110 may set $T_{D2}$ as 2 ms, for example. As such, the further CBS messages may be received more frequently, thereby avoiding missing different CBB messages.

Alternatively, or in addition, in the case that a change among the received CBS message is detected, the terminal device 110 may set a time length for the second receiving time interval $T_{R2}$ above a receiving threshold (denoted as "$T_{Rth}$"). The receiving threshold $T_{Rth}$ may be determined depending on relevant factors such as system requirements, experimental values, and so on. Specifically, in an implementation, $T_{Rth}$ may be set equal to or less than the first receiving time interval $T_{R1}$ 414. In other words, the second receiving time interval may be longer than the first receiving time interval, that is, $T_{R2} > T_{R1}$. Only for the purpose of illustration, if the $T_{R1}$ is 10 ms, the terminal device 110 may set $T_{R2}$ as 15 ms, for example.

On the other hand, if the CBS messages received in $T_{R1}$ 414 remain unchanged, in some implementations, the terminal device 110 may set the length of $T_{D2}$ 422 to be longer the dormant threshold $T_{Dth}$. The dormant threshold $T_{Dth}$, as discussed above, may be equal to the length of $T_{D1}$ 412. As such, the frequency of reception of further CBS messages may be reduced. Only for the purpose of illustration, if $T_{D1}$ is 5 ms, the terminal device 110 may set $T_{D2}$ as 10 ms, for example. Alternatively, or in addition, the terminal device 110 may set the length of $T_{R2}$ 424 less than the receiving threshold $T_{Rth}$ which can be equal to or less than $T_{R1}$ in some implementations. That is, it is possible to set $T_{R2} < T_{R1}$. Only for the purpose of illustration, if the $T_{R1}$ is 10 ms, the terminal device 110 may set $T_{R2}$ as 5 ms, for example. In this way, the terminal device 110 is extricated from frequently receiving the same CBS messages, thereby saving energy. In this way, the terminal device 110 may configure a subsequent DRX period based on the received CBS messages. As such, the terminal device 110 may receive further CBS messages in the subsequent DRX period in a smart way. As a result, the power consumption of the terminal device can be reduced efficiently. Optionally, in some implementations, after the first receiving time interval, the terminal device 110 enters the second dormant time interval and does not receive any CBS message until the second dormant time interval expires. Then, the terminal device 110 starts to receive further CBS message(s) from the network device 120 again. For instance, in the example of FIG. 4, the second dominant time interval $T_{D2}$ expires at the time point 404, and the second receiving time interval $T_{R2}$ starts at the time point 404. Thus, at the time point 404, the terminal device 110 wakes up from a dormant status to receive a further CBS message.

In yet other implementations, in response to determining that the further CBS message is identical to at least one of the CBS messages received in the first receiving time interval, the terminal device 110 may reduce a time length for the second receiving time interval. The time length may be reduced in a variety of ways, for example, according to importance of the further CBS message. For example, if the type of the further CBS message is advised or optional, the time length may be reduced from 10 ms to 5 ms. If the type is mandatory, the time length may be reduced from 10 ms to 8 ms.

Still considering the example shown in FIG. 4, if the further CBS message received at 404 is determined to be identical to the CBS message received at the time point 403, the terminal device 110 may determine that the further CBS message is a repetition of the previously received CBS message. Accordingly, the terminal device 110 configures a shorter $T_{R2}$ to save power.

In still yet other implementations, in response to determining that the further CBS message is invalid, the terminal device 110 may reduce a time length for the second receiving time interval. Whether a CBS message is invalid may be determined in a variety of ways. For example, if the CBS message does not comply a format predefined according to a certain specification, or the type of the CBS message cannot determined from the head, the terminal device 110 may determine that the CBS message is invalid. It is understood that the above example is described for discussion, rather than limitation. There may be many other ways to determine the validation of the CBS message in other implementations.

Still considering the example shown in FIG. 4, if the terminal device determines that the further CBS message received at 404 is invalid, the terminal device 110 may determine that the further CBS message is useless. Accordingly, the terminal device 110 configures a shorter $T_{R2}$ to save power.

In this way, the terminal device 110 may dynamically adjust the length of the second receiving time interval, either at the end of the first receiving time interval, for example, at the time point 403 in the example of FIG. 4, or at the start of the second receiving time interval. As such, the power consumption of the terminal device can be reduced efficiently.

It is to be understood that the above example is described for discussion, rather than limitation. In some implementations, even if the terminal device 110 determines that the further CBS message is identical to a previously received CBS message, it may not reduce the time length for the second receiving time interval, for example, if the type of the further CBS message is mandatory. In some implementations, in response to determining that the further CBS message is identical to at least one of the CBS messages received in the first receiving time interval, or the further CBS message is invalid, the terminal device 110 may increase the time length of the dormant time interval of a subsequent DRX period (also referred to as the "third DRX period") to save power.

Figure 5:
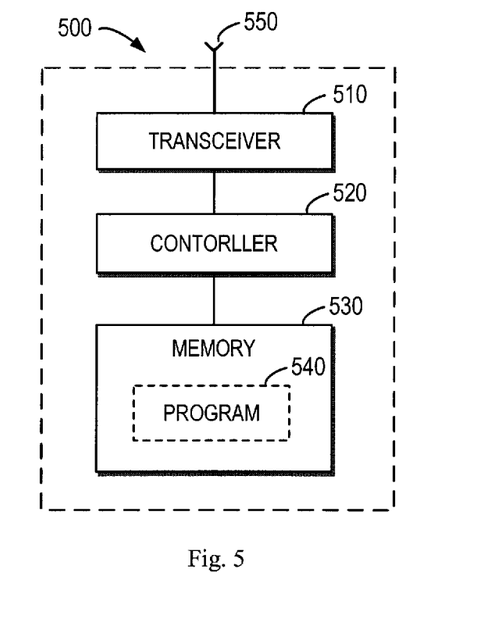
FIG. 5 is a block diagram of a device 500 suitable for implementing one or more implementations of the subject matter described herein.

FIG. 5 is a block diagram of a device 500 suitable for implementing one or more implementations of the subject matter described herein. For example, the device 500 may function as the terminal device 110 as discussed above with reference to FIG. 1. Description of the device 500 is not intended to suggest any limitation as to scope of use or functionality of the subject matter described herein, as various implementations may be implemented in diverse general-purpose or special-purpose environments.

As shown, the device 500 includes a controller 520 and a memory 530. The controller 520 may be a real or a virtual processor that is capable of executing a program or computer-executable instructions 540 stored in the memory 530. The memory 530 may be volatile memory (e.g., registers, cache, RAM), non-volatile memory (e.g., ROM, EEPROM, flash memory), or some combination thereof.

In the example shown in FIG. 5, the device 500 further includes a transceiver 510. The transceiver 510 may be configured by the controller 520 to perform communications with other one or more devices, for example, via an antenna (s) or an antenna array(s) 550. In some implementations, the controller 520 may be configured by the program 540 stored in the memory 530 to work with the transceiver 510 to carry out the methods 200 and/or 300 as described above.

Additionally, functionality of the components of the device 500 may be implemented in a single computing machine, for example, a single mobile phone, or in multiple computing machines that are able to communicate over communication connections, for example, a cloud system. The device 500 may operate in an environment (for example, the environment 100) of a communication system following any suitable wireless communication standards, such as LTE-Advanced (LTE-A), LTE, Wideband Code Division Multiple Access (WCDMA), High-Speed Packet Access (HSPA), and so on. Furthermore, the communications between devices in the communication network may be performed according to any suitable generation communication protocols, including, but not limited to, the first generation (1G), the second generation (2G), 2.5G, 2.75G, the third generation (3G), the fourth generation (4G), 4.5G, the future fifth generation (5G) communication protocols, and/or any other protocols either currently known or to be developed in the future.

For the purpose of illustrating spirit and principle of the subject matter described herein, some specific implementations thereof have been described above. Through the self-learning process, terminal device may receive further CBS messages in a flexible receiving time interval, instead of a fixed receiving time interval. As a result, the power consumption of the terminal device for receiving the CBS messages can be reduced.

Now only for the purpose of illustration, some example implemented will be listed below.

The subject matter described herein may be embodied as a method implemented at a terminal device. The method comprises receiving CBS messages from a network device in a first receiving time interval of a first DRX period, the first DRX period including at least the first receiving time interval and a first dormant time interval without receipt of CBS messages; detecting whether there is a change among the CBS messages; and determining, based on the detection, a configuration of a second DRX period, the second DRX period at least including a second dormant time interval after the first receiving time interval and a second receiving time interval for receiving further CBS messages.

In some implementations, the detecting whether there is a change among the CBS messages comprises: detecting a change of types of the CBS messages received in the first receiving time interval, the type of a CBS message indicating that the CBS message is mandatory, optional, or advised.

In some implementations, the determining a configuration of a second DRX period comprises: in response to detecting the change among the CBS messages, setting a time length for the second dormant time interval below a dormant threshold; and in response to determining that the CBS messages remain unchanged, setting the time length for the second dormant time interval above the dormant threshold.

In some implementations, the method further comprises: determining the dormant threshold based on the first dormant time interval.

In some implementations, the determining a configuration of a second DRX period comprises: in response to detecting the change among the CBS messages, setting a time length for the second receiving time interval above a receiving threshold; and in response to determining that the CBS messages remain unchanged, setting the time length for the second receiving time interval below the receiving threshold.

The subject matter described herein can be also embodied as a terminal device. The terminal device comprises: a receiver configured to receive Cell Broadcast Service (CBS) messages from a network device in a first receiving time interval of a first Discontinuous Reception (DRX) period, the first DRX period including at least the first receiving time interval and a first dormant time interval without receipt of CBS messages; a controller configured to: detect whether there is a change among the CBS messages; and determine, based on the detection, a configuration of a second DRX period, the second DRX period at least including a second dormant time interval after the first receiving time interval and a second receiving time interval for receiving further CBS messages.

In some implementations, the controller is configured to detect a change of types of the CBS messages received in the first receiving time interval, the type of a CBS message indicating that the CBS message is mandatory, optional, or advised.

In some implementations, the controller is configured to in response to detecting the change among the CBS messages, set a time length for the second dormant time interval below a dormant threshold; and in response to determining that the CBS messages remain unchanged, set the time length for the second dormant time interval above the dormant threshold.

In some implementations, the controller is configured to determine the dormant threshold based on the first dormant time interval.

In some implementations, the controller is configured to in response to detecting the change among the CBS messages, set a time length for the second receiving time interval above a receiving threshold; and in response to determining that the CBS messages remain unchanged, set the time length for the second receiving time interval below the receiving threshold.

In some implementations, the controller is configured to determine the receiving threshold based on the first receiving time interval.

In some implementations, the receiver is configured to, in response to the second dominant time interval expiring, receive a further CBS message from the network device. In such implementations, the controller is further configured to, in response to determining that the further CBS message is identical to at least one of the CBS messages received in the first receiving time interval, reduce a time length for the second receiving time interval.

The subject matter described herein may be embodied as a computer program product being tangibly stored on a non-transient machine-readable medium and comprising machine-executable instructions. The instructions, when executed by a terminal device, cause the terminal device to: receive CBS messages from a network device in a first receiving time interval of a first DRX period, the first DRX period including at least the first receiving time interval and a first dormant time interval without receipt of CBS messages; detect whether there is a change among the CBS messages; and determine, based on the detection, a configuration of a second DRX period, the second DRX period at least including a second dormant time interval after the first receiving time interval and a second receiving time interval for receiving further CBS messages.

In some implementations, the instructions, when executed by the terminal device, further cause the terminal device to: detect a change of types of the CBS messages received in the first receiving time interval, the type of a CBS message indicating that the CBS message is mandatory, optional, or advised.

In some implementations, the instructions, when executed by the terminal device, further cause the terminal device to: in response to detecting the change among the CBS messages, set a time length for the second dormant time interval below a dormant threshold; and in response to determining that the CBS messages remain unchanged, set the time length for the second dormant time interval above the dormant threshold.

In some implementations, the instructions, when executed by the terminal device, further cause the terminal device to: determine the dormant threshold based on the first dormant time interval.

In some implementations, the instructions, when executed by the terminal device, further cause the terminal device to: in response to detecting the change among the CBS messages, set a time length for the second receiving time interval above a receiving threshold; and in response to determining that the CBS messages remain unchanged, set the time length for the second receiving time interval below the receiving threshold.

In some implementations, the instructions, when executed by the terminal device, further cause the terminal device to: determine the receiving threshold based on the first receiving time interval.

In some implementations, the instructions, when executed by the terminal device, further cause the terminal device to: in response to the second dominant time interval expiring, receive a further CBS message from the network device; and in response to determining that the further CBS message is identical to at least one of the CBS messages received in the first receiving time interval, reduce a time length for the second receiving time interval.

Implementations of the subject matter described herein may further include one or more computer program products being tangibly stored on a non-transient machine-readable medium and comprising machine-executable instructions. The instructions, when executed on a device, causing the device to carry out one or more processes as described above.

Example implementations may be implemented in hardware or special purpose circuits, software, logic or any combination thereof. Some aspects may be implemented in hardware, while other aspects may be implemented in firmware or software which may be executed by a controller, microprocessor or other computing device. While various aspects of the example implementations of the subject matter described herein are illustrated and described as block diagrams, flowcharts, or using some other pictorial representation, it will be appreciated that the blocks, apparatus, systems, techniques or methods described herein may be implemented in, as non-limiting examples, hardware, software, firmware, special purpose circuits or logic, general purpose hardware or controller or other computing devices, or some combination thereof.

In the context of the subject matter described herein, a machine readable medium may be any tangible medium that can contain, or store a program for use by or in connection with an instruction execution system, apparatus, or device. The machine readable medium may be a machine readable signal medium or a machine readable storage medium. A machine readable medium may include but not limited to an electronic, magnetic, optical, electromagnetic, infrared, or semiconductor system, apparatus, or device, or any suitable combination of the foregoing. More specific examples of the machine readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Computer program code for carrying out methods of the subject matter described herein may be written in any combination of one or more programming languages. These computer program codes may be provided to a processor of a general purpose computer, special purpose computer, or other programmable data processing apparatus, such that the program codes, when executed by the processor of the computer or other programmable data processing apparatus, cause the functions or operations specified in the flowcharts and/or block diagrams to be implemented. The program code may execute entirely on a computer, partly on the computer, as a stand-alone software package, partly on the computer and partly on a remote computer or entirely on the remote computer or server.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of any disclosure or of what may be claimed, but rather as descriptions of features that may be specific to particular implementations of particular disclosures. Certain features that are described in this specification in the context of separate implementations can also be implemented in combination in a single implementation. Conversely, various features that are described in the context of a single implementation can also be implemented in multiple implementations separately or in any suitable sub-combination.

Various modifications, adaptations to the foregoing example implementations of this disclosure may become apparent to those skilled in the relevant arts in view of the foregoing description, when read in conjunction with the accompanying drawings. Any and all modifications will still fall within the scope of the non-limiting and example implementations of this disclosure. Furthermore, other implementations of the disclosures set forth herein will come to mind to one skilled in the art to which these implementations of the disclosure pertain having the benefit of the teachings presented in the foregoing descriptions and the drawings.

Therefore, it will be appreciated that the implementations of the disclosure are not to be limited to the specific implementations disclosed and that modifications and other implementations are intended to be included within the scope of the appended claims. Although specific terms are used herein, they are used in a generic and descriptive sense only and not for purposes of limitation.

What is claimed is:

1. A method implemented at a terminal device, comprising:
receiving a first Cell Broadcast Service (CBS) message and a second CBS message from a network device in a first receiving time interval of a first Discontinuous Reception (DRX) period, the first DRX period including at least the first receiving time interval and a first dormant time interval without receipt of CBS messages;
detecting at least one difference between a first characteristic of the first CBS message and a second characteristic of the second CBS message;
decreasing a second dormant time interval of a second DRX period based at least in part on detecting that the first characteristic is different from the second characteristic, wherein the second dormant time interval occurs after the first receiving time interval;
increasing a second receiving time interval of the second DRX period based at least in part on detecting that the first characteristic is different from the second characteristic;
in response to the second dormant time interval expiring, receiving a further CBS message from the network device; and in response to determining that the further CBS message is identical to at least one of the first CBS message or the second CBS message received in the first receiving time interval, reducing a time length for the second receiving time interval.

2. The method of claim 1, wherein the detecting whether the first characteristic of the first CBS message is different from the second characteristic of the second CBS message comprises:
    detecting that a first type of the first CBS message is different from a second type of the second CBS message, a type of a CBS message indicating that the CBS message is mandatory, optional, or advised.

3. The method of claim 1, further comprising:
    determining a dormant threshold based on the first dormant time interval.

4. The method of claim 1, further comprising:
    determining a receiving threshold based on the first receiving time interval.

5. The method of claim 1, wherein the first CBS message and the second CBS message contain information related to one or more of traffic, weather, an advertisement, or an emergency.

6. The method of claim 1, wherein the first characteristic indicates a first type of information contained in the first CBS message and the second characteristic indicates a second type of information contained in the second CBS message.

7. The method of claim 1, wherein the first characteristic indicates a first type of event carried by the first CBS message and the second characteristic indicates a second type of event carried by the second CBS message.

8. A terminal device comprising:
    a receiver configured to receive a first Cell Broadcast Service (CBS) message and a second CBS message from a network device in a first receiving time interval of a first Discontinuous Reception (DRX) period, the first DRX period including at least the first receiving time interval and a first dormant time interval without receipt of CBS messages; and
    a controller configured to:
        detect that a first characteristic of the first CBS message is identical to a second characteristic of the second CBS message;
        increase a second dormant time interval of a second DRX period based at least in part on detecting that the first characteristic is identical to the second characteristic, wherein the second dormant time interval occurs after the first receiving time interval; and
        decrease a second receiving time interval of the second DRX period based at least in part on detecting that the first characteristic is identical to the second characteristic.

9. The terminal device of claim 8, wherein the controller is configured to:
    in response to detecting a change among two or more CBS messages, set a time length for the second dormant time interval below a dormant threshold; and
    in response to determining that the two or more CBS messages remain unchanged, set the time length for the second dormant time interval above the dormant threshold.

10. The terminal device of claim 9, wherein the controller is further configured to:
    determine the dormant threshold based on the first dormant time interval.

11. The terminal device of claim 8, wherein the controller is configured to:
    in response to detecting a change among two or more CBS messages, set a time length for the second receiving time interval above a receiving threshold; and
    in response to determining that the two or more CBS messages remain unchanged, set the time length for the second receiving time interval below the receiving threshold.

12. The terminal device of claim 11, wherein the controller is configured to:
    determine the receiving threshold based on the first receiving time interval.

13. The terminal device of claim 8, wherein the receiver is further configured to, in response to the second dormant time interval expiring, receive a further CBS message from the network device, and
    wherein the controller is further configured to, in response to determining that the further CBS message is identical to at least one CBS message received in the first receiving time interval, reduce a time length for the second receiving time interval.

14. A computer program product being tangibly stored on a non-transient machine-readable medium and comprising machine-executable instructions, the instructions, when executed by a terminal device, causing the terminal device to:
    receive a first Cell Broadcast Service (CBS) message and a second CBS message from a network device in a first receiving time interval of a first Discontinuous Reception (DRX) period, the first DRX period including at least the first receiving time interval and a first dormant time interval without receipt of CBS messages;
    detect whether a first characteristic of the first CBS message is different from a second characteristic of the second CBS message;
    in response to detecting the first characteristic of the first CBS message is different from the second characteristic of the second CBS message, set a time length for a second dormant time interval of a second DRX period below a dormant threshold, wherein the second dormant time interval occurs after the first receiving time interval;
    in response to determining that the first characteristic of the first CBS message is not different from the second characteristic of the second CBS message, set the time length for the second dormant time interval above the dormant threshold;
    in response to the second dormant time interval expiring, receive a further CBS message from the network device; and
    in response to determining that the further CBS message is identical to at least one of the first CBS message or the second CBS message received in the first receiving time interval, reduce a time length for the second receiving time interval.

15. The computer program product of claim 14, wherein the instructions, when executed by the terminal device, cause the terminal device to:
    detect that a first type of the first CBS message is different from a second type of the second CBS message received in the first receiving time interval, a type of a CBS message indicating that the CBS message is mandatory, optional, or advised.

16. The computer program product of claim 14, wherein the instructions, when executed by the terminal device, further cause the terminal device to:

determine the dormant threshold based on the first dormant time interval.

17. The computer program product of claim 14, wherein the instructions, when executed by the terminal device, cause the terminal device to:
set the dormant threshold;
set a receiving threshold; and
in response to detecting the first characteristic of the first CBS message is different from the second characteristic of the second CBS message, set a time length for a second receiving time interval of the second DRX period above the receiving threshold.

* * * * *